United States Patent
Xun et al.

(10) Patent No.: US 7,496,501 B2
(45) Date of Patent: *Feb. 24, 2009

(54) SYSTEM AND METHOD FOR IDENTIFYING BASE NOUN PHRASES

(75) Inventors: Endong Xun, Hong Kong (CN); Ming Zhou, Beijing (CN); Chang-Ning Huang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 911 days.

This patent is subject to a terminal disclaimer.

(21) Appl. No.: 10/977,979

(22) Filed: Oct. 29, 2004

(65) Prior Publication Data
US 2005/0071149 A1    Mar. 31, 2005

Related U.S. Application Data

(62) Division of application No. 09/873,656, filed on Jun. 4, 2001, now Pat. No. 6,859,771, which is a division of application No. 09/840,772, filed on Apr. 23, 2001, now Pat. No. 7,315,809.

(51) Int. Cl.
G06F 17/27    (2006.01)

(52) U.S. Cl. .............. 704/9; 704/1; 704/10; 704/231; 704/251; 707/2; 707/3; 707/4; 707/5; 707/6; 715/255; 715/257; 715/259

(58) Field of Classification Search .......... 704/1, 704/9, 10, 231, 251; 715/255, 257, 259; 707/2–6
See application file for complete search history.

(56) References Cited

U.S. PATENT DOCUMENTS

| | | | |
|---|---|---|---|
| 5,146,405 A | 9/1992 | Church | 704/9 |
| 5,535,121 A * | 7/1996 | Roche et al. | 704/9 |
| 5,537,317 A * | 7/1996 | Schabes et al. | 704/9 |
| 5,680,628 A | 10/1997 | Carus et al. | 704/1 |
| 5,696,962 A | 12/1997 | Kupiec | 707/4 |
| 5,799,269 A | 8/1998 | Schabes et al. | 704/9 |
| 5,845,306 A * | 12/1998 | Schabes et al. | 715/209 |
| 5,878,386 A | 3/1999 | Coughlin | 704/10 |
| 5,890,103 A | 3/1999 | Carus | 704/9 |
| 5,930,746 A | 7/1999 | Ting | 704/9 |
| 5,963,940 A | 10/1999 | Liddy et al. | 707/5 |
| 6,167,368 A | 12/2000 | Wacholder | 704/9 |
| 6,182,028 B1 | 1/2001 | Karaali et al. | 704/9 |
| 6,278,967 B1 | 8/2001 | Akers et al. | 704/2 |
| 6,289,304 B1 | 9/2001 | Grefenstette | 704/9 |

(Continued)

OTHER PUBLICATIONS

Argamon-Engelson et al., A Memory-Based Approach to Learning Shallow Natural Language Patterns, 1999, ArXiv:cmp-I6/9806011v3, pp. 1-26.*

(Continued)

*Primary Examiner*—Patrick N Edouard
*Assistant Examiner*—Lamont M Spooner
(74) *Attorney, Agent, or Firm*—Westman, Champlin & Kelly, P.A.

(57) ABSTRACT

A system and method identify base noun phrases (baseNP) in a linguistic input. A part-of-speech tagger identifies N-best part-of-speech tag sequences corresponding to the linguistic input. A baseNP identifier identifies baseNPs in the linguistic input using a unified statistical model that identifies the baseNPs, given the N-best POS sequences.

20 Claims, 12 Drawing Sheets

U.S. PATENT DOCUMENTS

| | | | |
|---|---|---|---|
| 6,631,346 B1 | 10/2003 | Karaorman et al. | 704/9 |
| 6,721,697 B1 | 4/2004 | Duan et al. | 704/9 |
| 6,859,771 B2* | 2/2005 | Xun et al. | 704/1 |
| 2002/0077806 A1 | 6/2002 | Tarbouriech et al. | 704/4 |

OTHER PUBLICATIONS

Sang et al., Applying System Combination to Base Noun Phrase Identification, 1999, ACL, proceedings of the 18th conference on Computational linguistics-V2, pp. 857-863.*

Sang et al. Applying System Combination to Base Noun Phrase Identification, 2000, pp. 857-863.*

Brill et al. (Man vs. machine: A case study in base noun phrase learning), ACL, 1999, pp. 65-72.*

Error Bounds for Convolutional Codes and an Asymptotically Optimum Decoding Algorithm, By: Andrew J. Viterbi pp. 260-269, Apr. 1967.

Noun-Phrase Model and Natural Query Language, By: M. Sibuya et al., IBM Journal of Research and Development. vol. 22, No. 5, pp. 533-540, Sep. 1978.

Estimation of Probabilities from Sparse Data for the Language Model Components of a Speech Recognizer, By: Slava M. Katz, Conf. IEEE Transactions on Acoustics, Speech and Signal Processing. vol. ASSP-35, pp. 400-401, Mar. 1987.

Contextual Reference of Noun Phrases in PLINIUS Part II. By: Ivana Korbayova, Prague Bulletin of Mathematical Linguistics No. 62, pp. 47-72, 1994, Czech Republic.

Forgetting Exceptions is Harmful in Language Learning, By: Walter Daelemans et al., Machine Learning vol. 34, No. 1-3, p. 11-41.

Building a Large Annotated Corpus of English: The Penn Treebank, By: Mitchell P. Marcus et al., 1993 Association for Computational Linguistics pp. 313-330.

Brill, Eric. 1995. "Unsupervised learning of disambiguation rules for part of speech tagging." In WVLC 3, p. 1-13.

Brill, Eric. 1993. "Transformation-based error-driven parsing." In Proceedings Third International Workshop on Parsing Technologies, Tilburg/Durbuy, The Netherlands/Belgium.

Abney, Steven. 1996. "Part-of-Speech tagging and partial parsing." In Steve Young and Gerrit Bloothooft (eds.), Corpus-Base Methods in Language and Speech Processing, pp. 118-136. Dordrecht: Kluwer Academic.

Manning et al., 1999. Foundations of Statistical Natural Language Processing. MIT Press, pp. 344, 366-367.

* cited by examiner

SYSTEM AND METHOD FOR IDENTIFYING BASE NOUN PHRASES

RELATED APPLICATIONS

This application is a divisional of U.S. patent application Ser. No. 09/873,656, entitled SYSTEM AND METHOD FOR IDENTIFYING BASE NOUN PHRASES, filed on Jun. 4, 2001, which is a divisional of U.S. patent application Ser. No. 09/840,772, entitled COMPUTER-AIDED READING SYSTEM AND METHOD WITH CROSS-LANGUAGE READING WIZARD, filed on Apr. 23, 2001

TECHNICAL FIELD

The present invention relates to natural language processing. More particularly, the present invention relates to identifying base noun phrases (baseNP).

BACKGROUND OF THE INVENTION

With the rapid development of the Internet, computer users all over the world are becoming increasingly more exposed to writings that are penned in non-native languages. Many users are entirely unfamiliar with non-native languages. Even for a user who has some training in a non-native language, it is often difficult for that user to read and comprehend the non-native language.

Consider the plight of a Chinese user who accesses web pages or other electronic documents written in English. The Chinese user may have had some formal training in English during school, but such training is often insufficient to enable them to fully read and comprehend certain words, phrases, or sentences written in English. The Chinese-English situation is used as but one example to illustrate the point. This problem persists across other language boundaries.

Natural language processing refers to machine processing of a natural language input. The natural language input can take any one of a variety of forms, including a textual input, a speech input, etc. Natural language processing attempts to gain an understanding of the meaning of the natural language input.

A base noun phrase (baseNP) as referred to herein is a noun phrase that does not contain other noun phrases recursively. For example, consider the sentence "Measures of manufacturing activity fell more than the overall measures." The elements within square brackets in the following marked up sentence are baseNPs:

[Measures/NNS] of/IN [manufacturing/VBG activity/NN] fell/VBD more/RBR than/IN [the/DT overall/JJ measures/NNS]./.

where the symbols NNS, IN, VBG, etc. are part-of-speech tags as defined in M. Markus, Marcin Kiewicx, B. Santorini, Building a large annotated corpus of English: The Penn Treebank, Computational linguistics 19 (2): 313-330, 1993.

Identifying baseNP in a natural language input is an important subtask for many natural language processing applications. Such applications include, for example, partial parsing, information retrieval, and machine translation. Identifying baseNP can be useful in other applications as well.

A number of different types of methods have been developed in the past in order to identify baseNP. Some methods involved applying a transform-based, error-driven algorithm to develop a set of transformation rules, and using those rules to locally update the bracket positions identifying baseNP. Other methods introduced a memory-based sequence learning method in which training examples are stored and a generalization is performed at run time by comparing the sequence provided in the new text to positive and negative evidence developed by the generalizations. Yet another approach is an error driven pruning approach that extracts baseNP rules from the training corpus and prunes a number of bad baseNP identifications by incremental training and then applies the pruned rules to identify baseNPs through maximum length matching (or dynamic programming algorithms).

Some of these prior approaches assigned scores to each of a number of possible baseNP structures. Still others dealt with identifying baseNP on a deterministic and local level. However, none of these approaches considered any lexical information in identifying baseNP. See, for example, Lance A. Ramshaw, Michael P. Markus (In press) Text Chunking Using Transformation-Based Learning: Natural Language Processing Using Very Large Corpora., Kluwer, The Second Workshop on Very Large Corpora. WVLC'95, pp. 82-94; Cardie and D. Pierce, Error-Driven Pruning of Treebank Grammars for BaseNP Identification, Proceedings of the 36th International Conference on Computational Linguistics, pp. 218-224, 1998 (COLING-ACL'98); and S. Argamon, I. Dagan and Y. Krymolowski, A Memory-Based Approach to Learning Shallow Language Patterns, Proceedings of the 17th International Conference on Computational Linguistics, pp. 67-73 (COLING-ACL'98).

In addition, it can be seen from the example sentence illustrated above that, prior to identifying baseNPs, part-of-speech (POS) tagging must be preformed. The prior techniques for identifying baseNP treated the POS tagging and baseNP identification as two separate procedures. The prior techniques identified a best estimate of the POS tag sequence corresponding to the natural language input. Only the best estimate was provided to the baseNP identification component. However, the best estimate of the POS tag sequence may not be the actual POS tag sequence which corresponds to the natural language input. This type of system leads to disadvantages. For example, using the result of the first step (POS tagging) as if it were certain and providing it to the second step (baseNP identification) leads to more errors in identifying baseNP.

SUMMARY OF THE INVENTION

A system and method identify base noun phrases (baseNP) in a linguistic input. A part-of-speech tagger identifies N-best part-of-speech tag sequences corresponding to the linguistic input. A baseNP identifier identifies baseNPs in the linguistic input using a unified statistical model that identifies the baseNPs, given the N-best POS sequences. In one illustrative embodiment, the unified statistical model considers a position of the POS tags with respect to words identified as baseNPs in the baseNP sequence.

DETAILED DESCRIPTION

Overview

A computer-aided reading system helps a user read a non-native language. For discussion purposes, the computer-aided reading system is described in the general context of browser programs executed by a general-purpose computer. However, the computer-aided reading system may be implemented in many different environments other than browsing (e.g., email systems, word processing, etc.) and may be practiced on many diverse types of devices.

The embodiments described below can permit users who are more comfortable communicating in a native language, to extensively read non-native language electronic documents quickly, conveniently, and in a manner that promotes focus and rapid assimilation of the subject matter. User convenience can be enhanced by providing a user interface with a translation window closely adjacent the text being translated. The translation window contains a translation of the translated text. By positioning the translation window closely adjacent the translated text, the user's eyes are not required to move very far to ascertain the translated text. This, in turn, reduces user-perceptible distraction that might otherwise persist if, for example, the user were required to glance a distance away in order to view the translated text.

User interaction is further enhanced, in some embodiments, by virtue of a mouse point translation process. A user is able, by positioning a mouse to select a portion of text, to quickly make their selection, whereupon the system automatically performs a translation and presents translated text to the user.

Exemplary System Architecture

Figure 1:
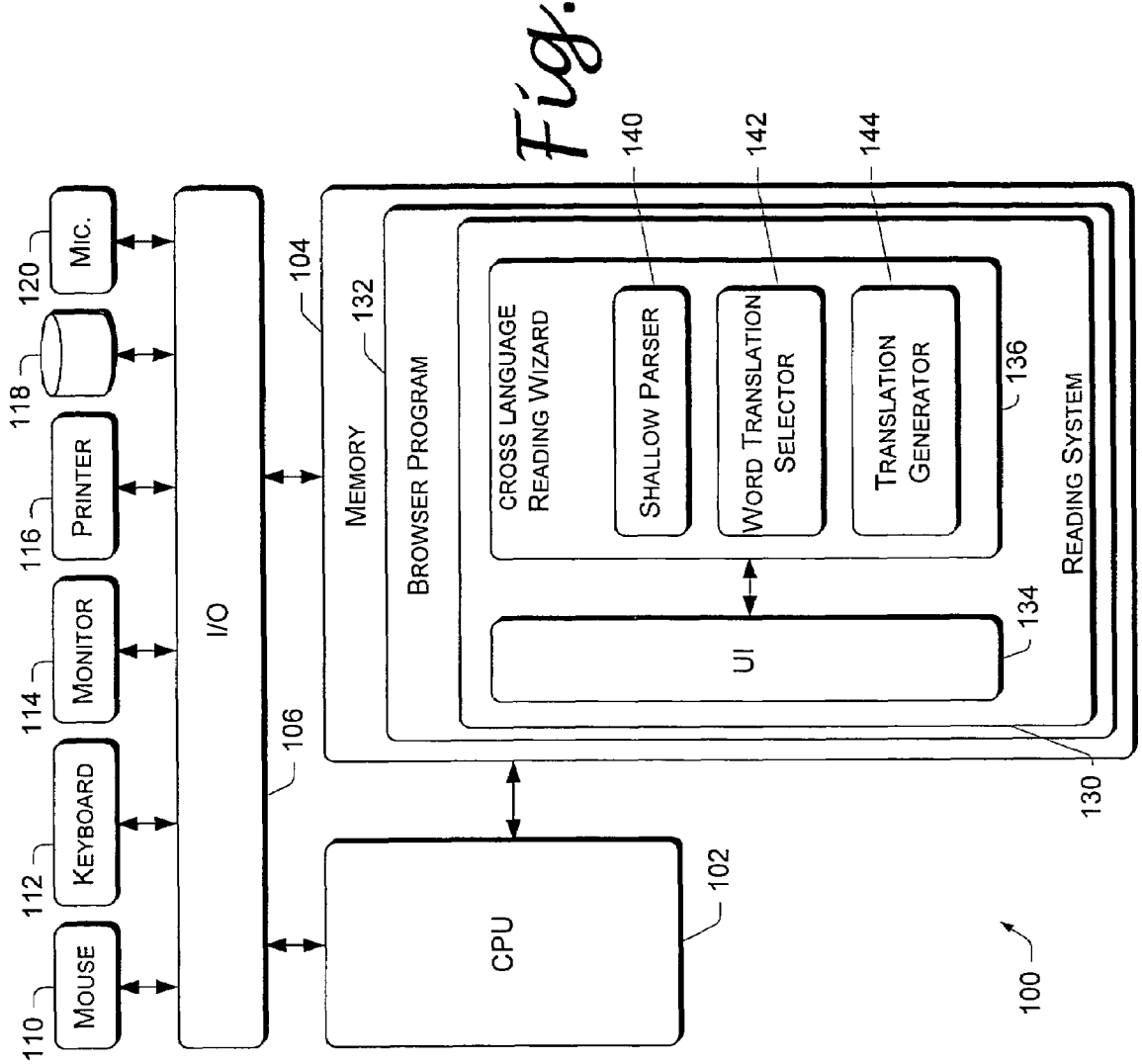
FIG. 1 is a block diagram of a computer system that implements a reading system with a cross-language reading wizard.

FIG. 1 shows an exemplary computer system 100 having a central processing unit (CPU) 102, a memory 104, and an input/output (I/O) interface 106. The CPU 102 communicates with the memory 104 and I/O interface 106. The memory 104 is representative of both volatile memory (e.g., RAM) and non-volatile memory (e.g., ROM, hard disk, etc.). Programs, data, files, and may be stored in memory 104 and executed on the CPU 102.

The computer system 100 has one or more peripheral devices connected via the I/O interface 106. Exemplary peripheral devices include a mouse 110, a keyboard 112 (e.g., an alphanumeric QWERTY keyboard, a phonetic keyboard, etc.), a display monitor 114, a printer 116, a peripheral storage device 118, and a microphone 120. The computer system may be implemented, for example, as a general-purpose computer. Accordingly, the computer system 100 implements a computer operating system (not shown) that is stored in memory 104 and executed on the CPU 102. The operating system is preferably a multi-tasking operating system that supports a windowing environment. An example of a suitable operating system is a Windows brand operating system from Microsoft Corporation.

It is noted that other computer system configurations may be used, such as hand-held devices, multiprocessor systems, microprocessor-based or programmable consumer electronics, network PCs, minicomputers, mainframe computers, and the like. In addition, although a standalone computer is illustrated in FIG. 1, the language input system may be practiced in distributed computing environments where tasks are performed by remote processing devices that are linked through a communications network (e.g., LAN, Internet, etc.). In a distributed computing environment, program modules may be located in both local and remote memory storage devices.

Exemplary Reading System

The computer system 100 implements a reading system 130 that assists users in reading non-native languages. The reading system can provide help at the word, phrase, or sentence level. The reading system is implemented in FIG. 1 as a browser program 132 stored in memory 104 and executed on CPU 102. It is to be appreciated and understood that the reading system described below can be implemented in contexts other than browser contexts.

The reading system 130 has a user interface 134 and a cross-language reading wizard 136. The UI 134 exposes the cross-language reading wizard 136. The browser program 132 may include other components in addition to the reading system, but such components are considered standard to browser programs and will not be shown or described in detail.

The reading wizard 136 includes a shallow parser 140, a statistical word translation selector 142, and a translation generator 144.

Exemplary Shallow Parser

The shallow parser 140 parses phrases or sentences of the selected non-native text into individual translation units (e.g., phrases, words).

Figure 2:
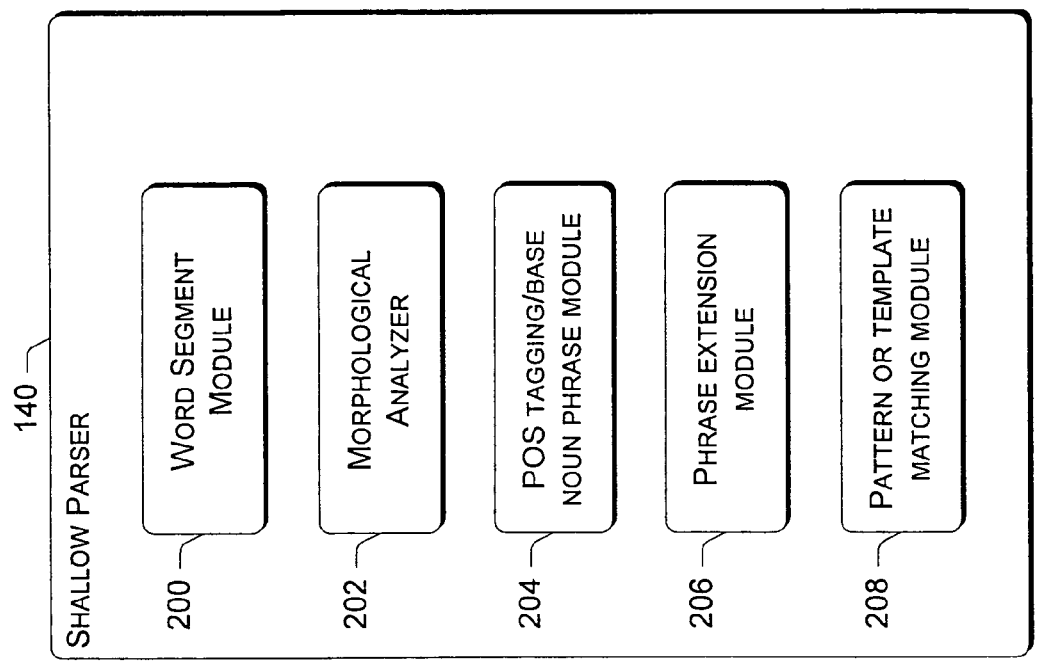
FIG. 2 is a block diagram of an exemplary shallow parser in accordance with one embodiment.

FIG. 2 shows shallow parser 140 in a little more detail in accordance with one embodiment. The shallow parser can be implemented in any suitable hardware, software, firmware or combination thereof. In the illustrated and described embodiment, the shallow parser is implemented in software.

As shown, shallow parser 140 comprises a word segment module 200, a morphological analyzer 202, a part-of-speech (POS) tagging/base noun phrase identification module 204, a phrase extension module 206, and a pattern or template matching module 208. Although these components are shown as individual components, it should be appreciated and understood that the components can be combined with one another or with other components.

In accordance with the described embodiment, shallow parser 140 segments words in text that has been selected by a user. It does this using word segment module 200. The shallow parser then uses morphological analyzer 202 to morphologically process the words to obtain the morphological root of each word. The morphological analyzer can apply various morphological rules to the words in order to find the morphological root of each word. The rules that morphological analyzer 202 uses can be developed by a person skilled in the particular language being analyzed. For example, one rule in English is that the morphological root of words that end in "ed" is formed by either removing the "d" or the "ed".

The shallow parser 140 employs part-of-speech (POS) tagging/base noun phrase (baseNP) identification module 204 to characterize the words and phrases for further translation selection. The POS tagging and baseNP identification can be performed, for example, by a statistical model, an example of which is described below in a section entitled "POS tagging and baseNP Identification" just below. The shallow parser 140 uses phrase extension module 206 to apply rule-based phrase extension to the words characterized by POS tagging/ base noun phrase identification module 204. One goal of the phrase extension module is to extend a base noun phrase to a more complex noun phrase. For example, "baseNP of baseNP" is the more complex noun phrase of the "baseNP" phrase. The shallow parser 140 also uses patterning or template matching module 208 to generate tree lists. The patterning or template matching module is used for translation and recognizes that some phrase translation is pattern dependent, and is not directly related to the words in the phrases. For example, the phrase "be interested in baseNP" contains a pattern (i.e. "baseNP") that is used to form a more complex translation unit for translation. The words "be interested in" are not directly related to the pattern that is used to form the more complex translation unit.

POS Tagging and BaseNP Identification

The following discussion describes a statistical model for automatic identification of English baseNP (Noun Phrase) and constitutes but one way of processing selected text so that a tree list can be generated. The described approach uses two steps: the N-best Part-Of-Speech (POS) tagging and baseNP identification given the N-best POS-sequences. The described model also integrates lexical information. Finally, a Viterbi algorithm is applied to make a global search in the entire sentence which permits a linear complexity for the entire process to be obtained.

The Statistical Approach

In this section, the two-pass statistical model, parameters training and the Viterbi algorithm for the search of the best sequences of POS tagging and baseNP identification are described. Before describing the algorithm, some notations that are used throughout are introduced.

Let us express an input sentence E as a word sequence and a sequence of POS respectively as follows:

$$E = w_1 w_2 \ldots w_{n-1} w_n$$

$$T = t_1 t_2 \ldots t_{n-1} t_n$$

where n is the number of words in the sentence, $t_i$ is the POS tag of the word $w_i$.

Given E, the result of the baseNP identification is assumed to be a sequence, in which some words are grouped into baseNP as follows $$\ldots w_{i-1} [w_i w_{i+1} \ldots w_j] w_{j+1} \ldots$$

The corresponding tag sequence is as follows:

$$B = \ldots t_{i-1} [t_i t_{i+1} \ldots t_j] t_{j+1} \ldots = t_{i-1} b_{i,j} t_{j+1} \ldots = n_1 n_2 \ldots n_m \quad (a)$$

in which $b_{i,j}$ corresponds to the tag sequence of a baseNP: $[t_i\ t_{i+1} \ldots t_j]$. $b_{i,j}$ may also be thought of as a baseNP rule. Therefore B is a sequence of both POS tags and baseNP rules. Thus $1 \leq m \leq n$, $n_i \in$ (POS tag set $\cup$ baseNP rules set). This is the first expression of a sentence with baseNP annotated. Sometimes, we also use the following equivalent form:

$$Q = \ldots (t_{i-1}, bm_{i-1})(t_i, bm_i)(t_{i+1}, bm_{i+1}) \ldots (t_j, bm_j)(t_{j+1}, bm_{j+1}) \ldots = q_1 q_2 \ldots q_n \quad (b)$$

where each POS tag $t_i$ is associated with its positional information $bm_i$ with respect to baseNPs. The positional information is one of {F,I,E,O,S}. F, E and I mean respectively that the word is the left boundary, right boundary of a baseNP, or at another position inside a baseNP. O means that the word is outside a baseNP. S marks a single word baseNP.

For example, the two expressions of the example sentence given in the background section above are as follows:

$$B = [NNS]\ IN\ [VBG\ NN]\ VBD\ RBR\ IN\ [DT\ JJ\ NNS] \quad (a)$$

$$Q = (NNS\ S)\ (IN\ O)\ (VBG\ F)\ (NN\ E)\ (VBD\ O)\ (RBR\ O)\ (IN\ O)\ (DT\ F)\ (JJ\ I)\ (NNS\ E)\ (.\ O) \quad (b)$$

An 'Integrated' Two-pass Procedure

The principle of the described approach is as follows. The most probable baseNP sequence B* may be expressed generally as follows:

$$B^* = \underset{B}{\operatorname{argmax}}\left(p(B\mid E)\right)$$

Where p(B|E) represents the probability of the sequence of POS tags and baseNP rules (B) given the English sentence E.

We separate the whole procedure into two passes, i.e.:

$$B^* \approx \underset{B}{\operatorname{argmax}}(P(T\mid E) \times P(B\mid T, E)) \quad (1)$$

Where P(T|E) represents the probability of a POS tag sequence T, given the input sentence E;

P(B|T,E) represents the probability of the sequence B, given the POS tag sequence T and the input sentence E.

In order to reduce the search space and computational complexity, we only consider the N best POS tagging of E, i.e.

$$T(N-\text{best}) = \underset{T=T_1,\ldots,T_N}{\operatorname{argmax}} (P(T\mid E)) \quad (2)$$

Therefore, we have:

$$B^* \approx \underset{B,T=T_1,\ldots,T_N}{\operatorname{argmax}} (P(T\mid E) \times P(B\mid T, E)) \quad (3)$$

Correspondingly, the algorithm is composed of two steps: determining the N-best POS tagging using Equation (2), and then determining the best baseNP sequence from those POS sequences using Equation (3). The two steps are integrated together, rather than separated as in other approaches. Let us now examine the two steps more closely.

Determining the N Best POS Sequences

The goal of the algorithm in the first pass is to search for the N-best POS-sequences within the search space (POS lattice). According to Bayes' Rule, we have $$P(T\mid E) = \frac{P(E\mid T) \times P(T)}{P(E)}$$

Since P(E) does not affect the maximizing procedure of P(T|E), equation (2) becomes $$T(N-\text{best}) = \underset{T=T_1,\ldots,T_N}{\operatorname{argmax}} (P(T|E)) = \underset{T=T_1,\ldots,T_N}{\operatorname{argmax}} (P(E|T) \times P(T)) \quad (4)$$

We now assume that the words in E are independent. Thus $$P(E|T) \approx \prod_{i=1}^{n} P(w_i | t_i) \quad (5)$$

We then use a trigram model as an approximation of P(T), i.e.:

$$P(T) \approx \prod_{i=1}^{n} P(t_i | t_{i-2}, t_{i-1}) \quad (6)$$

Finally we have $$T(N-\text{best}) = \underset{T=T_1,\ldots,T_N}{\operatorname{argmax}} (P(T|E)) \quad (7)$$
$$= \underset{T=T_1,\ldots,T_N}{\operatorname{argmax}} \left( \prod_{i=1}^{n} P(w_i|t_i) \times P(t_i|t_{i-2}, t_{i-1}) \right)$$

This model thus outputs the N-best POS tag sequences for the given natural language input.

In the Viterbi algorithm of the N best search, $P(w_i|t_i)$ is called the lexical generation (or output) probability, and $P(t_i|t_{i-2},t_{i-1})$ is called the transition probability in the Hidden Markov Model. The Viterbi algorithm is described in Viterbi, *Error Bounds for Convolution Codes and Asymptotically Optimum Decoding Algorithm*, IEEE Transactions on Information Theory IT-13(2): pp. 260-269, April, 1967.

Determining the BaseNPs

As mentioned before, the goal of the second pass is to search the best baseNP-sequence given the N-best POS-sequences.

Considering E, T and B as random variables, according to Bayes' Rule, we have $$P(B|T,E) = \frac{P(B|T) \times P(E|B,T)}{P(E|T)} \quad (8)$$

Since $P(B|T) = \frac{P(T|B) \times P(B)}{P(T)}$ we have, $$P(B|T,E) = \frac{P(E|B,T) \times P(T|B) \times P(B)}{P(E|T) \times P(T)}$$

Because we search for the best baseNP sequence for each possible POS-sequence of the given sentence E, $P(E|T) \times P(T) = P(E \cap T) = \text{const}$. Furthermore, from the definition of B, during each search procedure, we have $$P(T|B) = \prod_{i=1}^{n} P(t_i, \ldots, t_j | b_{i,j}) = 1.$$

Therefore, equation (3) becomes $$B^* = \underset{B,T=T_1,\ldots,T_N}{\operatorname{argmax}} (P(T|E) \times P(B|T,E)) \quad (9)$$
$$= \underset{B,T=T_1,\ldots,T_N}{\operatorname{argmax}} (P(T|E) \times P(E|B,T) \times P(B))$$

using the independence assumption, we have $$P(E|B,T) \approx \prod_{i=1}^{n} P(w_i | t_i, bm_i). \quad (10)$$

With trigram approximation of P(B), we have:

$$P(B) \approx \prod_{i=1}^{m} P(n_i | n_{i-2}, n_{i-1}) \quad (11)$$

Finally, we obtain $$B^* = \underset{B,T=T_1,\ldots,T_N}{\operatorname{argmax}} \left( P(T|E) \times \prod_{i=1}^{n} P(w_i | bm_i, t_i) \times \prod_{i=1,m} P(n_i | n_{i-2}, n_{i-1}) \right) \quad (12)$$

It should be noted that the unified statistical model illustrated by equation 12 not only determines a likely baseNP given all of the N-best possible POS tag sequences corresponding to the natural language input E, but the second term and equation 12 utilizes lexical information to do this. In other words, the second term on the right side of equation 12 takes into account the position of the present POS tag with respect to identified baseNP.

To summarize, in the first step, the Viterbi N-best searching algorithm is applied in the POS tagging procedure and determines a path probability $f_t$ for each POS sequence calculated as follows:

$$f_t = \prod_{i=1,n} p(w_i | t_i) \times p(t_i | t_{i-2}, t_{i-1})$$

(which corresponds to the first term in equation 12). In the second step, for each possible POS tagging result, the Viterbi algorithm is applied again to search for the best baseNP sequence. Every baseNP sequence found in this pass is also associated with a path probability $$f_b = \prod_{i=1}^{n} p(w_i | t_i, bm_i) \times \prod_{i=1,m} p(n_i | n_{i-2}, n_{i-1}).$$

The integrated probability of a baseNP sequence is determined by $f_t^\alpha \times f_b$, where $\alpha$ is a normalization coefficient ($\alpha=2.4$ in our experiments). When we determine the best baseNP sequence for the given sentence E, we also determine the best POS sequence of E, since it is that POS sequence that corresponds to the best baseNP of E.

As an example of how this can work, consider the following text: "stock was down 9.1 points yesterday morning." In the first pass, one of the N-best POS tagging results of the sentence is: T=NN VBD RB CD NNS NN NN.

Figure 3:
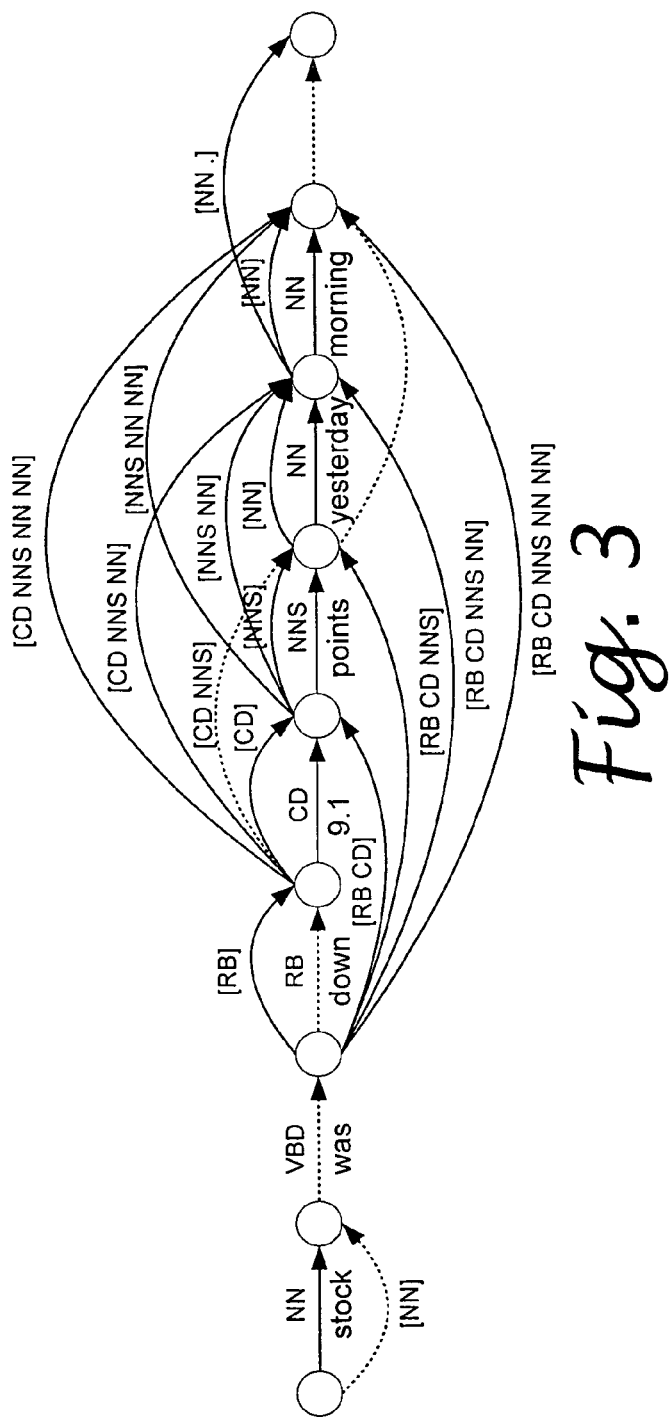
FIG. 3 is a diagram that is useful in understanding processing that takes place in accordance with one embodiment.
Figure 4:
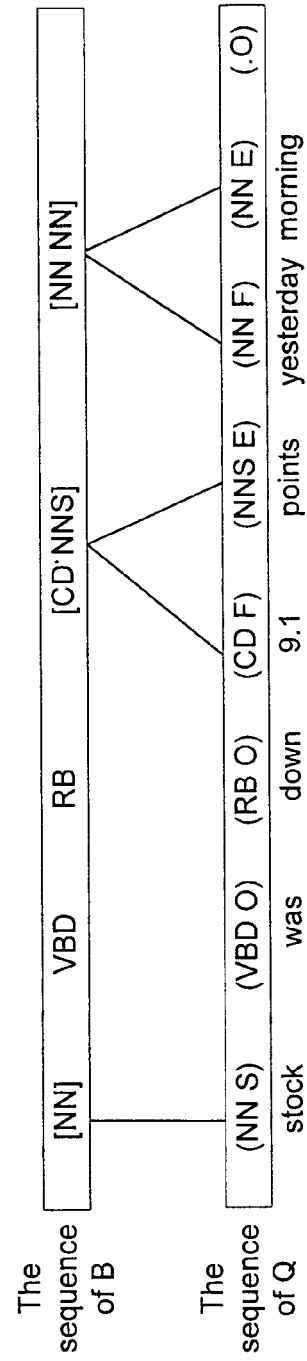
FIG. 4 is a diagram that is useful in understanding the FIG. 3 diagram.

For this POS sequence, the second pass will try to determine the baseNPs as shown in FIG. 3. The details of the path in the dashed line are given in FIG. 4. Its probability calculated in the second pass is as follows (Φ is pseudo variable used where no previous context information is available for a given term):

$$P(B\,|\,T, E) = p(\text{stock}\,|\,NN, S) \times p(\text{was}\,|\,VBD, O) \times$$
$$p(\text{down}\,|\,RB, O) \times p(\text{NUMBER}\,|\,CD, B) \times$$
$$p(\text{points}\,|\,NNS, E) \times p(\text{yesterday}\,|\,NN, B) \times$$
$$p(\text{morning}\,|\,NN, E) \times p(.\,|\,., O) \times p([NN]\,|\,\Phi, \Phi) \times$$
$$p(VBD\,|\,\Phi, [NN]) \times p(RB\,|\,[NN], VBD) \times$$
$$p([CD\ NNS]\,|\,VBD, RB) \times$$
$$p([NN\ NN]\,|\,RB, [CD\ NNS]) \times$$
$$p(.\,|\,[CD\ NNS], [NN\ NN])$$

The Statistical Parameter Training

While the specific statistical parameter training methods do not form part of the invention, they are described herein simply for the sake of completeness.

In this work, the training and testing data were derived from the 25 sections of Penn Treebank. We divided the whole Penn Treebank data into two sections, one for training and the other for testing.

In our statistical model, we calculate the following four probabilities: (1) $P(t_i|t_{i-2},t_{i-1})$, (2) $P(w_i|t_i)$, (3) $P(n_i|n_{i-2}n_{i-1})$ and (4) $P(w_i|t_i,bm_i)$. The first and the third parameters are trigrams of T and B respectively. The second and the fourth are lexical generation probabilities. Probabilities (1) and (2) can be calculated from POS tagged data with following formulae:

$$p(t_i\,|\,t_{i-2}, t_{i-1}) = \frac{\text{count}(t_{i-2}t_{i-1}t_i)}{\sum_j \text{count}(t_{i-2}t_{i-1}t_j)} \quad (13)$$

$$p(w_i\,|\,t_i) = \frac{\text{count}(w_i\ \text{with tag}\ t_i)}{\text{count}(t_i)} \quad (14)$$

As each sentence in the training set has both POS tags and baseNP boundary tags, it can be converted to the two sequences as B (a) and Q (b) described in the last section. Using these sequences, parameters (3) and (4) can be calculated with calculation formulas that are similar to equations (13) and (14) respectively.

Before training trigram model (3), all possible baseNP rules should be extracted from the training corpus. For instance, the following three sequences are among the baseNP rules extracted.

```
(1) DT CD CD NNPS
(2) RB JJ NNS NNS
(3) NN NN POS NN
```

... ...

There are more than 6,000 baseNP rules in the Penn Treebank. When training trigram model (3), we treat those baseNP rules in two ways. First, each baseNP rule is assigned a unique identifier (UID). This means that the algorithm considers the corresponding structure of each baseNP rule. Second, all of those rules are assigned to the same identifier (SID). In this case, those rules are grouped into the same class. Nevertheless, the identifiers of baseNP rules are still different from the identifiers assigned to POS tags.

For parameter smoothing, an approach was used as described in Katz, *Estimation of Probabilities from Sparse Data for Language Model Component of Speech Recognize*, IEEE Transactions on Acoustics, Speech, and Signal Processing, Volume ASSP-35, pp. 400-401, March 1987. A trigram model was built to predict the probabilities of parameter (1) and (3). In the case that unknown words are encountered during baseNP identification, a parameters (2) and (4) are calculated in the following way:

$$p(w_i\,|\,bm_i, t_i) = \frac{\text{count}(bm_i, t_i)}{\max_j(\text{count}(bm_j, t_i))^2} \quad (15)$$

$$p(w_i\,|\,t_i) = \frac{\text{count}(t_i)}{\max_j(\text{count}(t_j))^2} \quad (16)$$

Here, $bm_j$ indicates all possible baseNP labels attached to $t_i$, and $t_j$ is a POS tag guessed for the unknown word $w_i$.

Figure 5:
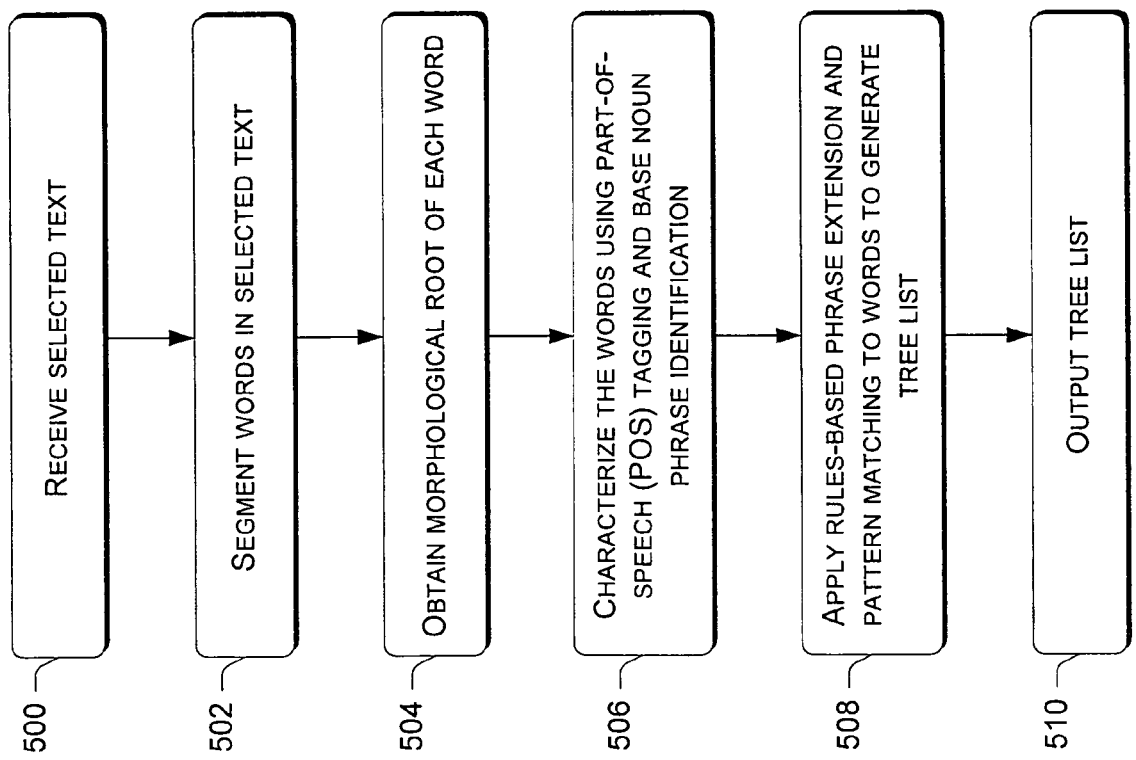
FIG. 5 is a flow diagram that describes steps in a method in accordance with one embodiment.

FIG. 5 is a flow diagram that describes steps in a method in accordance with one embodiment. The steps can be implemented in any suitable hardware, software, firmware or combination thereof. In the illustrated example, the steps are implemented in software. One particular embodiment of such software can be found in the above-mentioned cross-language writing wizard 136 which forms part of browser program 132 (FIG. 1). More specifically, the method about to be described can be implemented by a shallow parser such as the one shown and described in FIG. 2.

Step 500 receives selected text. This step is implemented in connection with a user selecting a portion of text that is to be translated. Typically, a user selects text by using an input device such as a mouse and the like. Step 502 segments words in the selected text. Any suitable segmentation processing can be performed as will be appreciated by those of skill in the art. Step 504 obtains the morphological root of each word. In the illustrated and described embodiment, this step is implemented by a morphological analyzer such as the one shown in FIG. 2. In the illustrated example, the morphological analyzer is configured to process words that are written in English. It is to be appreciated and understood, however, that any suitable language can provide a foundation upon which a morphological analyzer can be built.

Step 506 characterizes the words using part-of-speech (POS) tagging and base noun phrase identification. Any suitable techniques can be utilized. One exemplary technique is described in detail in the "POS Tagging and BaseNP Identification" section above. Step 508 applies rules-based phrase extension and pattern matching to the characterized words to generate a tree list. In the above example, this step was implemented using a phrase extension module 206 and a pattern or template matching module 208. Step 510 outputs the tree list for further processing.

Figure 6:
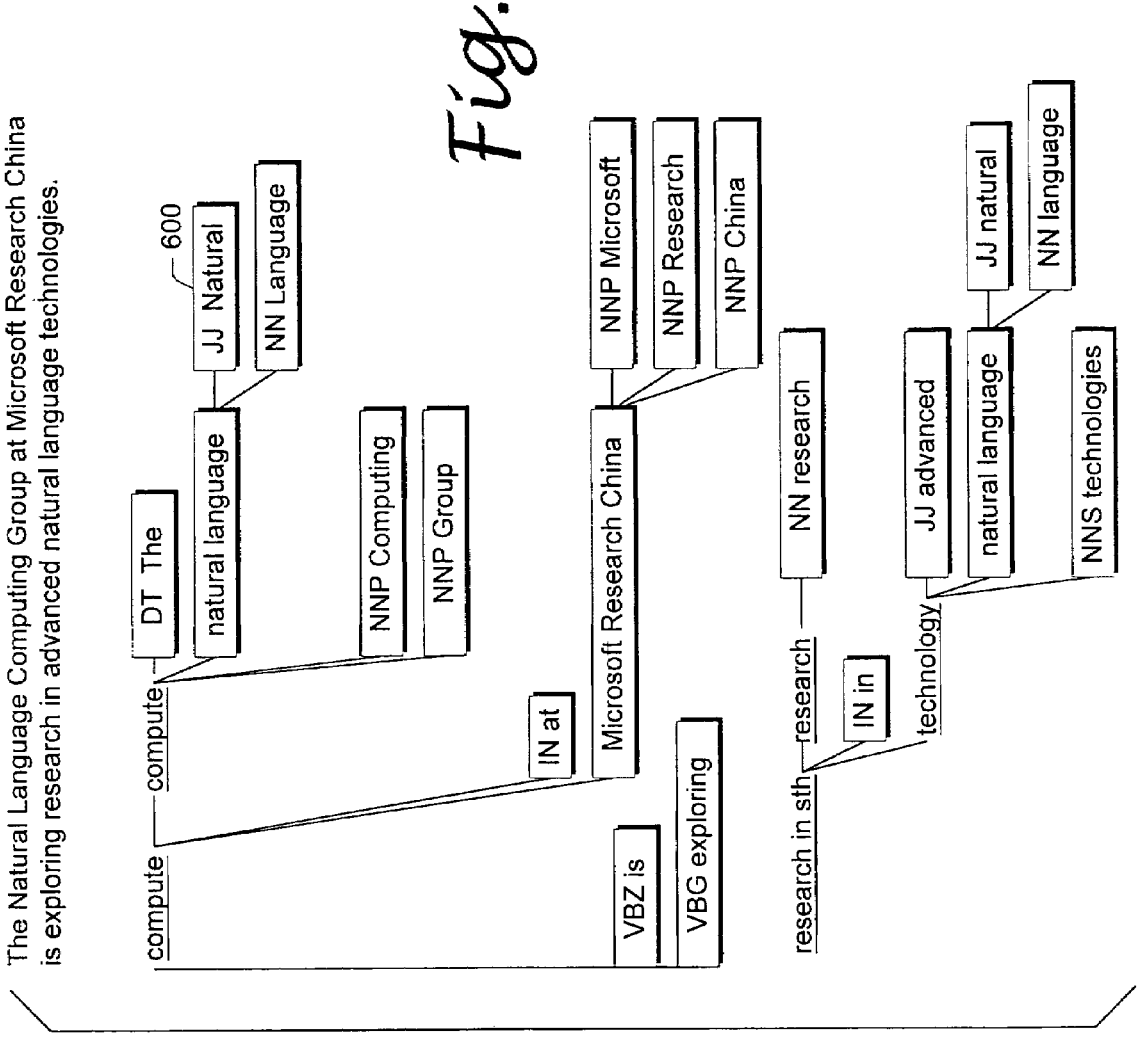
FIG. 6 is a diagram that is useful in understanding processing that takes place in accordance with one embodiment.

As an example of a tree list, consider FIG. 6. There, the sentence "The Natural Language Computing Group at Microsoft Research China is exploring research in advanced natural language technologies" has been processed as described above. Specifically, the tree list illustrates the individual words of the sentence having been segmented, morphologically processed, and characterized using the POS tagging and baseNP techniques described above. For example, consider element 600. There, the word "Natural" has been segmented from the sentence and from a parent element "natural language". Element 600 has also been characterized with the POS tag "JJ". Other elements in the tree have been similarly processed.

Exemplary Word Translation Selector

The word translation selector 142 receives the tree lists and generates all possible translation patterns. The selector 142 translates the parsed translation units using a statistical translation and language models to derive top candidate word translations in the native text. The top candidate translations are output.

Figure 7:
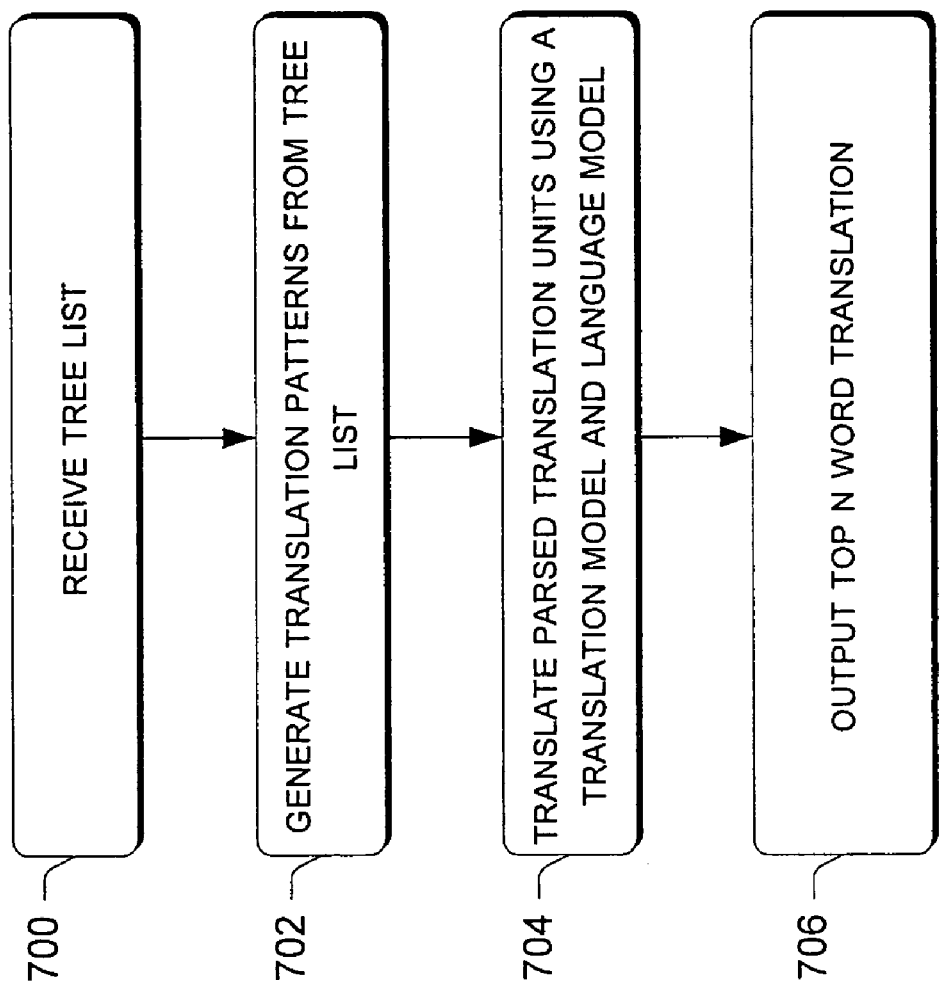
FIG. 7 is a flow diagram that describes steps in a method in accordance with one embodiment.

FIG. 7 is a flow diagram that describes steps in a method in accordance with one embodiment. The method can be implemented in any suitable hardware, software, firmware or combination thereof. In the illustrated and described embodiment, the method is implemented in software. One embodiment of such software can comprise word translation selector 142 (FIG. 1).

Step 700 receives a tree list that has been produced according to the processing described above. Step 702 generates translation patterns from the tree list. In one embodiment, all possible translation patterns are generated. For example, for English to Chinese translation, the English noun phrase "NP1 of NP2" may have two kinds of possible translations: (1) T(NP1)+T(NP2), and (2) T(NP2)+T(NP1). In the phrase translation, the translated phrase is a syntax tree and, in one embodiment, all possible translation orders are considered. Step 704 translates parsed translation units using a translation model and language model. The translation units can comprise words and phrases. Step 704 then outputs the top N candidate word translations. The top N candidate word translations can be selected using statistical models.

Exemplary Translation Generator

The translation generator 144 translates the top N candidate word translations to corresponding phrases in the native language. The native words and phrases are then presented via the UI in proximity to the selected text.

Figure 8:
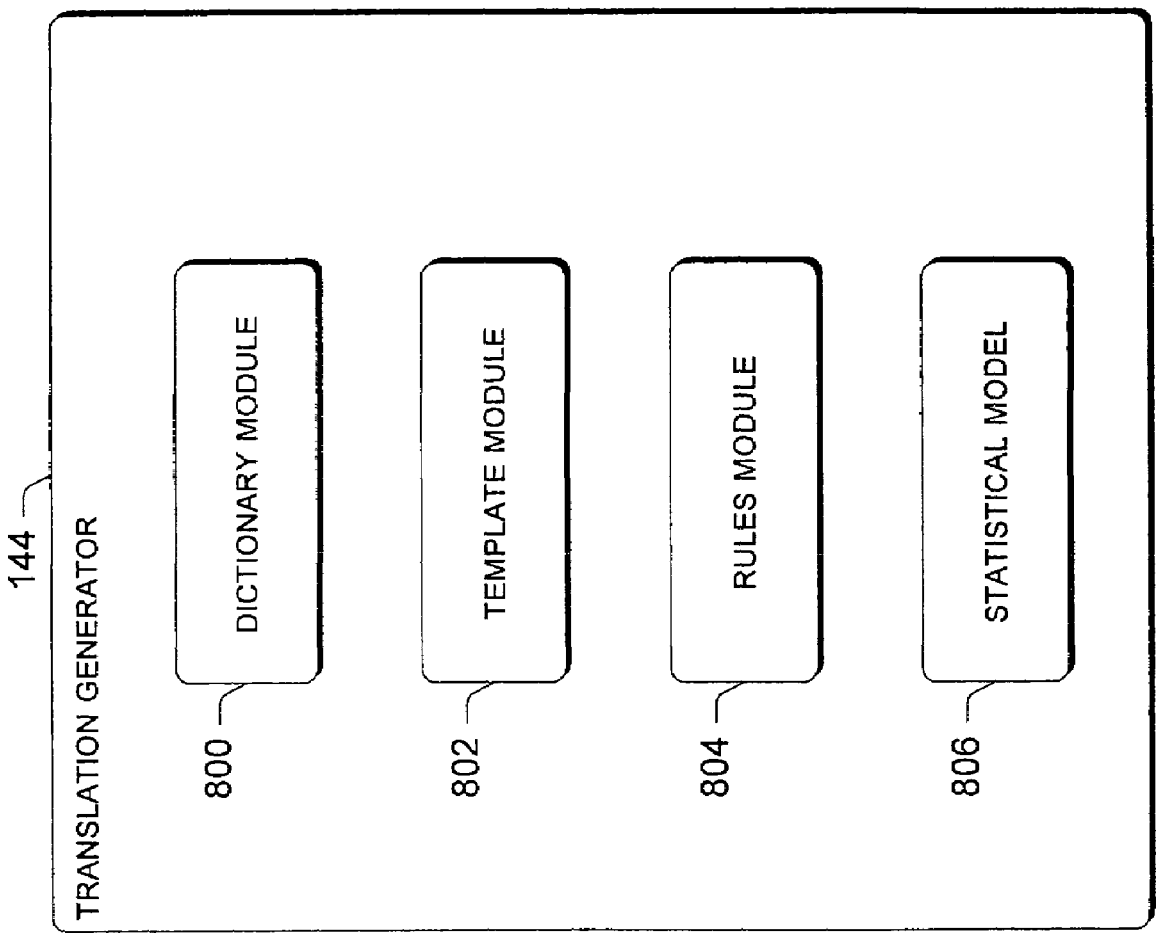
FIG. 8 is a block diagram of an exemplary translation generator in accordance with one embodiment.

FIG. 8 shows translation generator 144 in a little more detail in accordance with one embodiment. To translate the top candidate words, the translation generator can draw upon a number of different resources. For example, the translation generator can include a dictionary module 800 that it uses in the translation process. The dictionary module 800 can include a word dictionary, phrase dictionary, irregular morphology dictionary or any other dictionaries that can typically be used in natural language translation processing, as will be apparent to those of skill in the art. The operation and functions of such dictionaries will be understood by those of skill in the art and, for the sake of brevity, are not described here in additional detail.

Translation generator 144 can include a template module 802 that contains multiple templates that are used in the translation processing. Any suitable templates can be utilized. For example, so-called large phrase templates can be utilized to assist in the translation process. The operation of templates for use in natural language translation is known and is not described here in additional detail.

The translation generator 144 can include a rules module 804 that contains multiple rules that are used to facilitate the translation process. Rules can be hand-drafted rules that are drafted by individuals who are skilled in the specific languages that are the subject of the translation. Rules can be drafted to address issues pertaining to statistical errors in translation, parsing, translation patterns. The principles of rules-based translations will be understood by those of skill in the art.

Translation generator 144 can include one or more statistical models 806 that are used in the translation process. The statistical models that can be used can vary widely, especially given the number of possible non-native and native languages relative to which translation is desired. The statistical models can be based on the above-described POS and baseNP statistical parameters. In a specific implementation where it is desired to translate from English to Chinese, the following models can be used: Chinese Trigram Language Model and the Chinese Mutual Information Model. Other models can, of course, be used.

The above-described modules and models can be used separately or in various combinations with one another.

At this point in the processing, a user has selected a portion of non-native language text that is to be translated into a native language. The selected text has been processed as described above. In the discussion that is provided just below, methods and systems are described that present the translated text to the user in a manner that is convenient and efficient for the user.

Reading Wizard User Interface

The remaining discussion is directed to features of the user interface 134 when presenting the reading wizard. In particular, the reading wizard user interface 134 permits the user to select text written in a non-native language that the user is unsure how to read and interpret. The selection may be an individual word, phrase, or sentence.

FIGS. 9-13 show exemplary reading wizard user interfaces implemented as graphical UIs (GUIs) that are presented to the user as part of a browser program or other computer-aided reading system. The illustrated examples show a reading system designed to assist a Chinese user when reading English text. The English text is displayed in the window. A user can select portions of the English text. In response to user selection, the reading wizard translates the selection into Chinese text and presents the Chinese text in a pop-up translation window or scrollable box.

Figure 9:
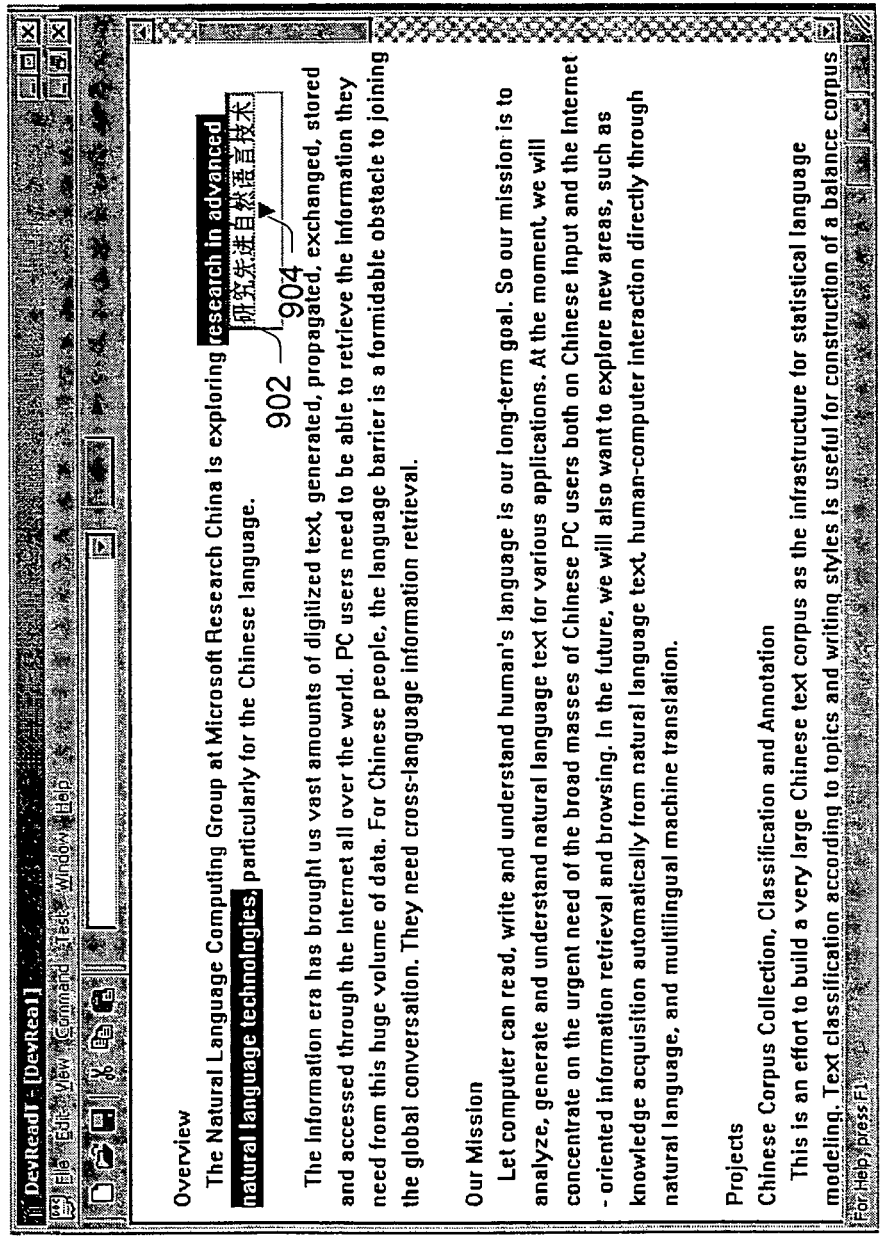
FIGS. 9-13 show various exemplary user interfaces in accordance with one embodiment.
Figure 10:
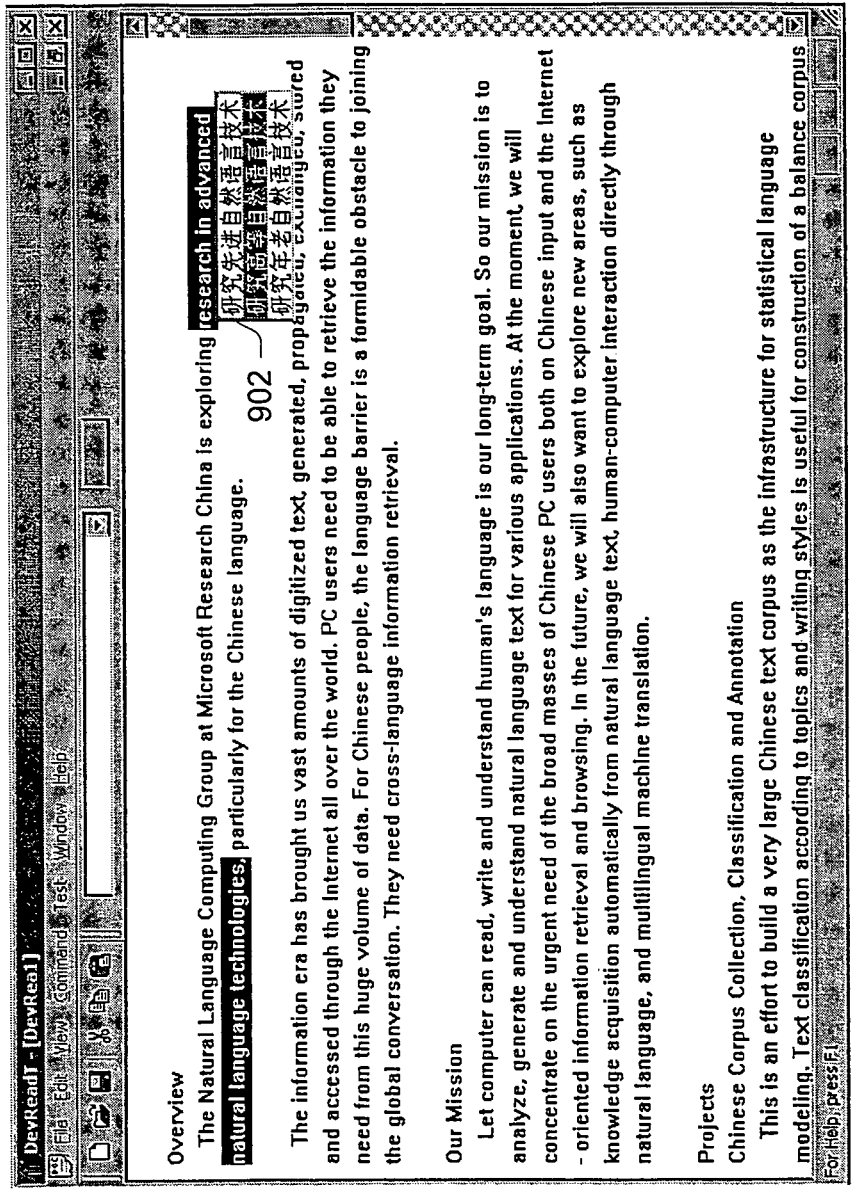

FIG. 9 shows a user interface 900 that includes a portion of "non-native" text that has been highlighted. The highlighted text is displayed in a first area of the user interface. A second area of the user interface in the form of translation window 902 is configured to display translated portions of at least some of the text in a native language. The highlighted text, in this example, comprises the phrase "research in advanced natural language technologies". In this example, a user has highlighted the word "advanced" and the reading system has automatically determined the word to comprise part of the phrase that is highlighted. The reading system then automatically shows the best translation of the highlighted phrase in translation window 902. By automatically determining a phrase that contains a user-selected word and then providing at least one translation for the phrase, the reader is provided with not only a translation of the word, but is provided a translated context in which the word is used. This is advantageous in that it gives the reader more translated information which, in turn, can facilitate their understanding of the material that they are reading.

Notice that the translation window 902 is located adjacent at least a portion of the highlighted text. By locating the translation window in this manner, the user is not required to divert their attention very far from the highlighted text in order to see the translated text. This is advantageous because it does not slow the user's reading process down an undesirable amount. Notice also that the translation window contains a drop down arrow 904 that can be used to expose other translated versions of the selected text. As an example, consider FIG. 10. There, translation window 902 has been dropped down to expose all translations of the highlighted phrase.

Figure 11:
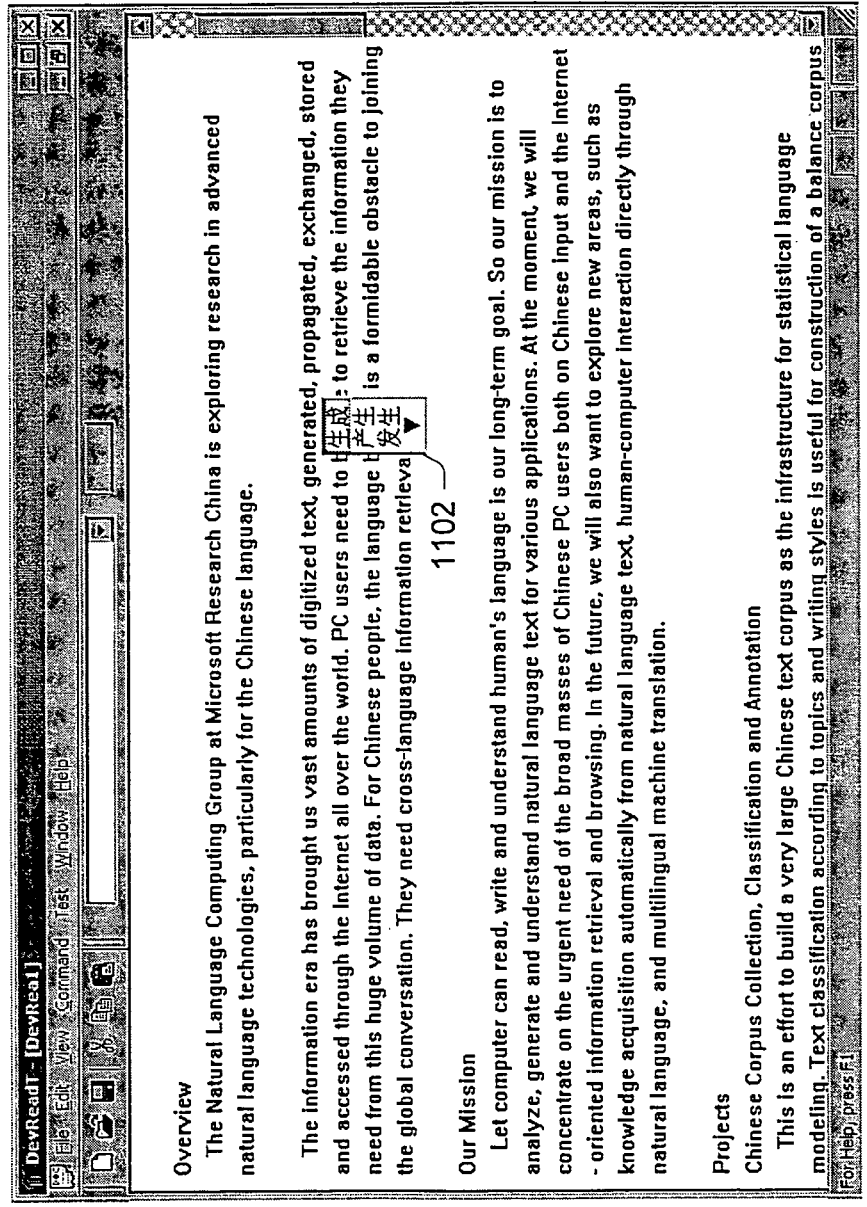
Figure 12:
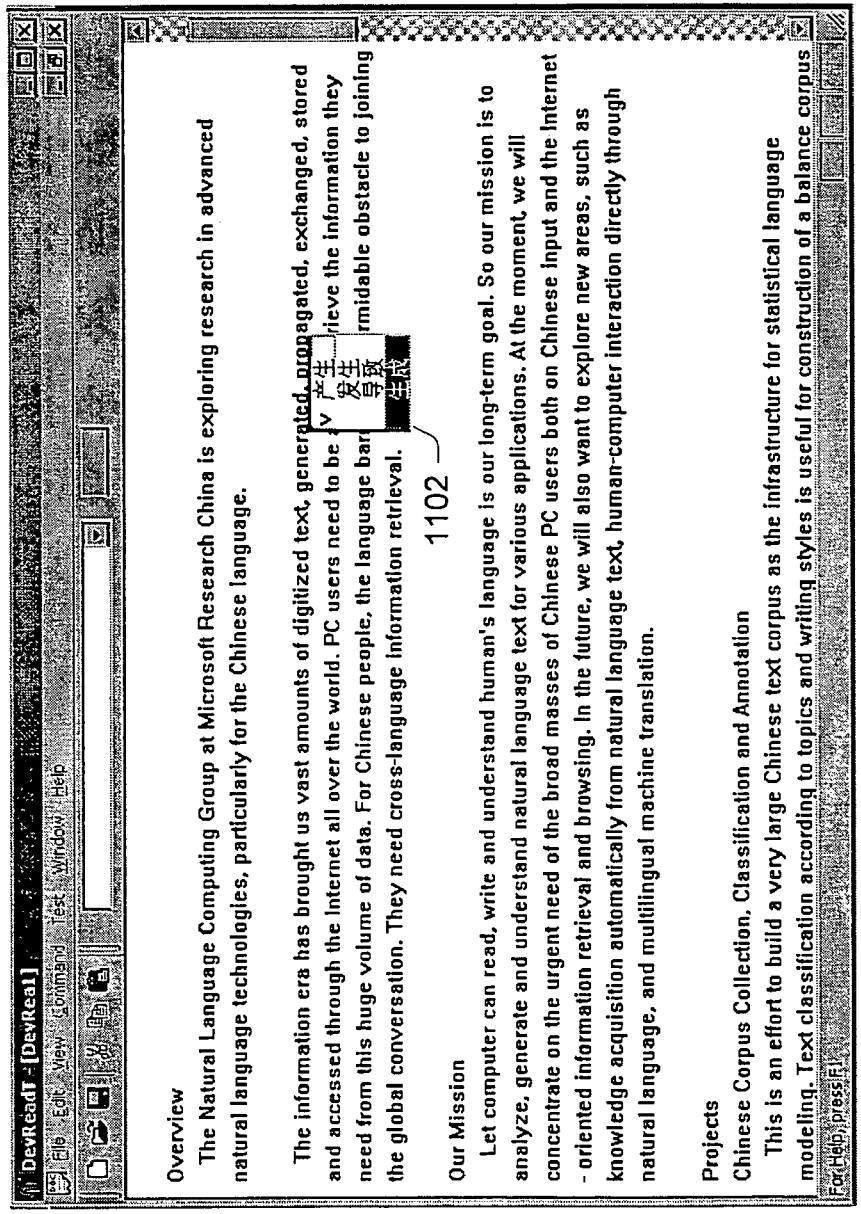

FIG. 11 shows a user interface 1100 having a translation window 1102. Here, the reading system automatically detects that the word "generated" is not in a phrase and translates only the word "generated." The reading system can also provide multiple most likely translations in the translation window 1102. For example, three exemplary likely translations are shown. In the illustrated example, the displayed translations are context sensitive and are sorted according to context. Accordingly, in this example, the reading system can show only the top n translations of the word, rather than all of the possible translations of the word. FIG. 12 shows user interface 1100 where all of the possible translations of the word "generated" are presented to the user in translation window 1102.

Figure 13:
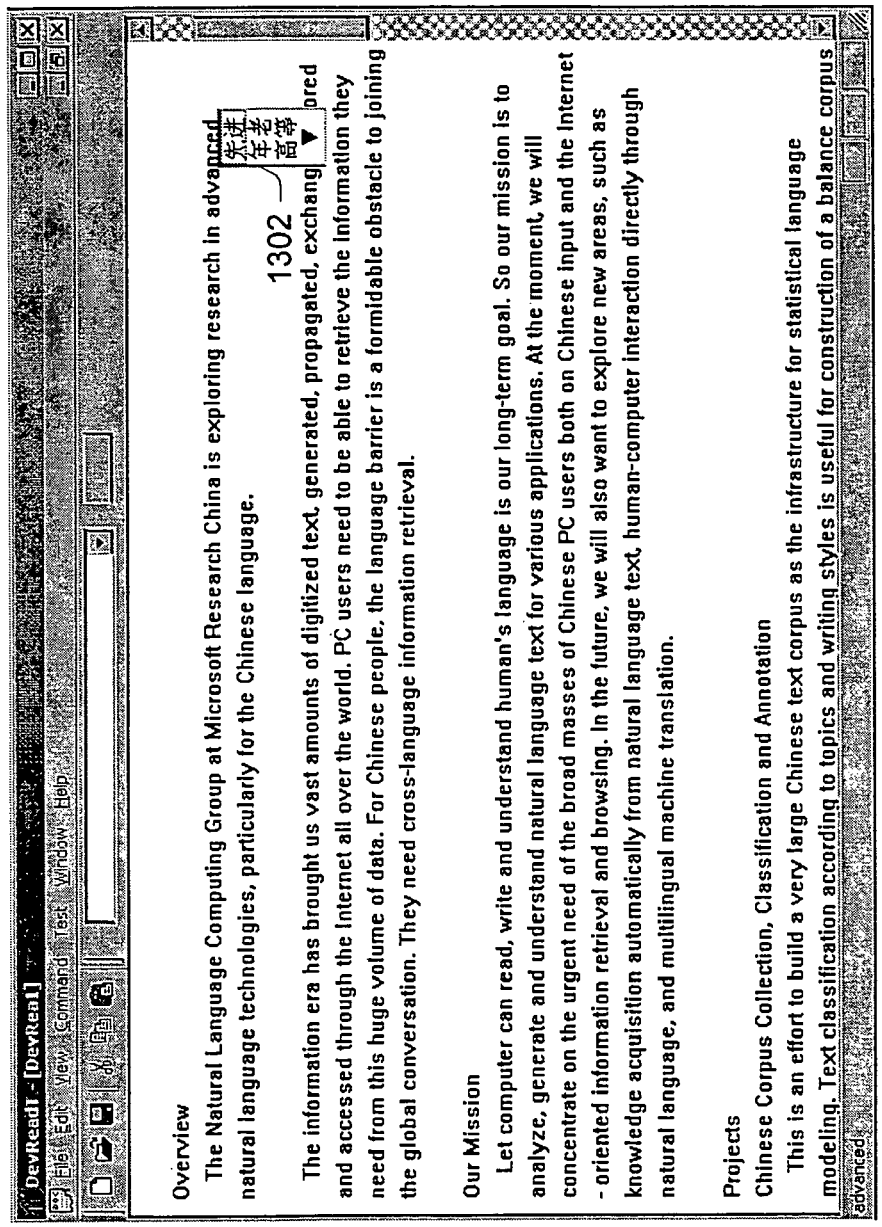

FIG. 13 shows a user interface 1300 having a translation window 1302 that illustrates one feature of the described embodiment. Specifically, the user can be given a choice as to whether they desire for an entire phrase containing a selected word to be translated, or whether they desire for only a selected word to be translated. In this example, the user has positioned their mouse in a manner that selects the word "advanced" for translation. Since the word "advanced" comprises part of a longer phrase, the reading system would automatically translate the phrase containing the selected word and then present the choices to the user as described above. In this case, however, the user has indicated to the reading system that they want only the selected word to be translated. They can do this in any suitable way as by, for example, depressing the "Ctrl" key when making a word selection.

CONCLUSION

The embodiments described above help a user read a non-native language and can permit users who are more comfortable communicating in a native language, to extensively read non-native language electronic documents quickly, conveniently, and in a manner that promotes focus and rapid assimilation of the subject matter. User convenience can be enhanced by providing a user interface with a translation window (containing the translated text) closely adjacent the text being translated. By positioning the translation window closely adjacent the translated text, the user's eyes are not required to move very far to ascertain the translated text. This, in turn, reduces user-perceptible distraction that might otherwise persist if, for example, the user were required to glance a distance away in order to view the translated text. User interaction is further enhanced, in some embodiments, by virtue of a mouse point translation process. A user is able, by positioning a mouse to select a portion of text, to quickly make their selection, whereupon the system automatically performs a translation and presents translated text to the user.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer readable medium having stored thereon instructions which, when executed, cause a computer to perform a method of processing a natural language input, comprising:
   identifying a plurality of N-best part-of-speech (POS) tag sequences corresponding to the natural language input;
   identifying a likely base noun phrase (baseNP) sequence based on the N-best POS tag sequences identified; and
   outputting the likely baseNP sequence.

2. The computer readable medium of claim 1 wherein identifying a likely baseNP sequence comprises:
   identifying a plurality of baseNP sequences for each of the N-best POS tag sequences that correspond to the natural language input; and
   calculating which of the plurality of baseNP sequences is most likely.

3. The computer readable medium of claim 2 wherein calculating which of the plurality of baseNP sequences is most likely comprises:
   calculating a likely baseNP sequence that is most likely based on lexical information indicative of a position of words in the natural language input relative to baseNPs identified in the baseNP sequences.

4. The computer readable medium of claim 3 wherein calculating a likely baseNP sequence that is most likely based on lexical information comprises:
   calculating a likely baseNP sequence that is most likely based on lexical information indicative of POS tags assigned to the words in the natural language input.

5. The computer readable medium of claim 3 wherein calculating a likely baseNP sequence comprises:
   calculating a likely baseNP sequence based on the lexical information for every word in the natural language input.

6. The computer readable medium of claim 3 wherein a baseNP rule comprises a sequence of POS tags corresponding to words in the natural language input identified as a baseNP and wherein calculating a likely baseNP sequence comprises:
   calculating a probability of POS tags and baseNP rules, given their context.

7. The computer readable medium of claim 6 wherein calculating a probability of POS tags and baseNP rules comprises:
   calculating the probability of POS tags and baseNP rules given n prior POS tags or baseNP rules.

8. The computer readable medium of claim 2 wherein the natural language input comprises a sentence and wherein calculating which of the plurality of baseNP sequences is most likely comprises:
   calculating which of the plurality of baseNP sequences is most likely over the entire sentence.

9. The computer readable medium of claim 1 wherein identifying a likely baseNP sequence includes:
   calculating a probability of each of the N-best POS tag sequences given the natural language input.

10. The computer readable medium of claim 1 wherein a component of the natural language input corresponds to a different part of speech tag in at least two of the identified N-best POS tag sequences.

11. The computer readable medium of claim 1 wherein one of the identified N-best POS tag sequences includes a POS tag that corresponds to a component of the natural language input and the POS tag is different than a POS tag that corresponds to the component of the natural language input in another one of the identified N-best POS tag sequences.

12. A computer readable medium storing instructions which, when executed by a computer, cause the computer to perform a method of processing a linguistic input, comprising:

identifying a plurality of N-best part-of-speech (POS) sequences corresponding to the linguistic input;

identifying one or more base noun phrases (baseNPs) for each of the N-best POS sequences to form a plurality of different possible baseNP sequences corresponding to each of the POS sequences; for each baseNP sequence, identifying whether it is a likely baseNP sequence based on a probability of the associated POS sequence and a probability of the baseNP sequence, given lexical information indicative of a position of words in the linguistic input relative to the baseNPs identified in the baseNP sequence; and outputting the likely baseNP sequence identified.

13. The computer readable medium of claim 12 wherein identifying one or more baseNPs for each of the N-best POS sequences comprises:

identifying baseNP rules for each of the N-best POS sequences, the baseNP rules comprising a sequence of POS tags corresponding to words in the linguistic input identified as a baseNP.

14. The computer readable medium of claim 13 wherein identifying whether each baseNP sequence is a likely baseNP sequence, comprises:

calculating a probability of POS tags and baseNP rules, given n prior POS tags or baseNP rules in the POS sequence.

15. The computer readable medium of claim 14 wherein the linguistic input comprises a sentence and wherein identifying whether each baseNP sequence is a likely baseNP sequence comprises:

identifying whether each baseNP sequence is a likely baseNP sequence over the entire sentence.

16. The computer readable medium of claim 12 wherein a component of the natural language input corresponds to a different part of speech tag in at least two of the identified N-best POS tag sequences.

17. A computer readable medium having stored thereon instructions which, when executed, cause a computer to perform a method of processing a natural language input, comprising:

identifying a plurality of N-best part-of-speech (POS) tag sequences corresponding to the natural language input, wherein each of the plurality of N-best POS tag sequences comprises a sequence of POS tags and wherein at least one of the plurality of N-best POS tag sequences includes a POS tag corresponding to a component of the natural language input and the POS tag is different than a POS tag corresponding to the component of the natural language input in another one of the N-best POS tag sequences;

identifying a likely base noun phrase (baseNP) sequence based on the N-best POS tag sequences identified; and outputting the likely baseNP sequence.

18. The computer readable medium of claim 17 wherein the natural language input comprises a sequence of words.

19. The computer readable medium of claim 18 wherein each POS tag corresponds to a word in the sequence of words.

20. The computer readable medium of claim 17 wherein identifying a likely baseNP sequence comprises:

identifying a plurality of baseNP sequences for each of the N-best POS tag sequences; and calculating which of the plurality of baseNP sequences is most likely.

* * * * *